July 31, 1962    R. ALFAYA ETAL    3,047,221
CALCULATOR

Filed June 10, 1960    5 Sheets-Sheet 1

INVENTORS
RAYMOND ALFAYA,
PETER A. LANDSKROENER,
KARL L. THAXTON,

BY Lynn Barratt Morris
ATTORNEY

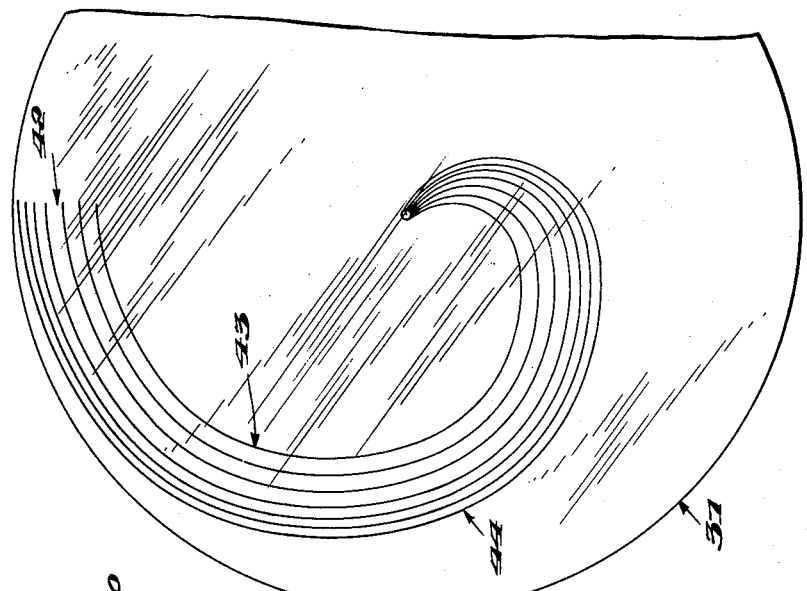
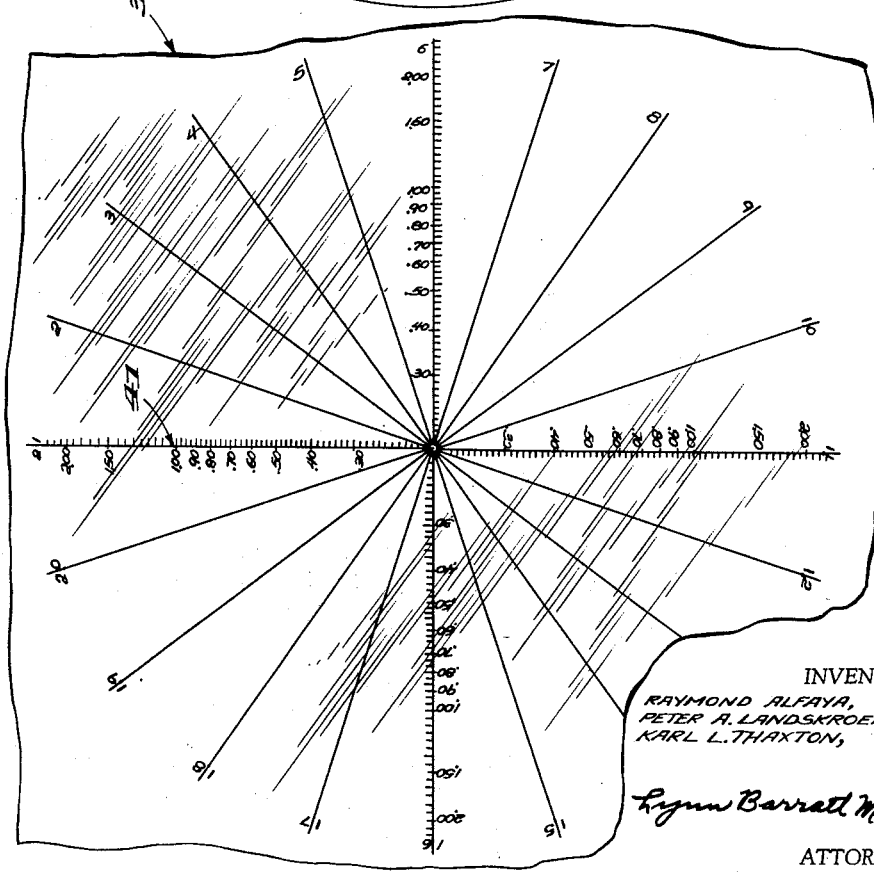

July 31, 1962  R. ALFAYA ET AL  3,047,221
CALCULATOR
Filed June 10, 1960  5 Sheets-Sheet 3
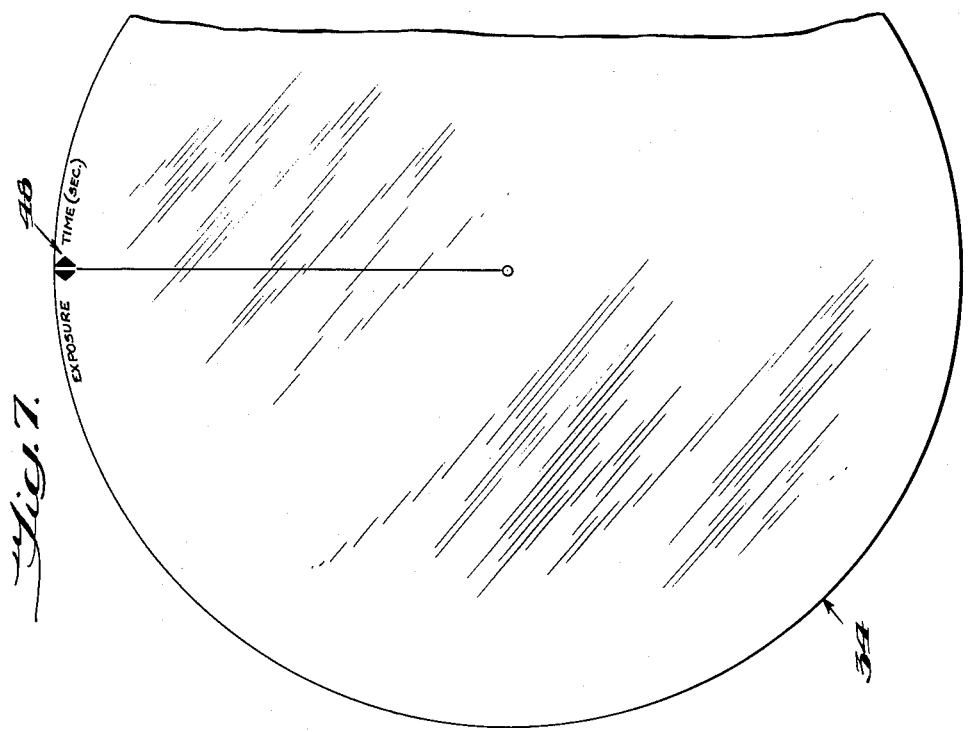
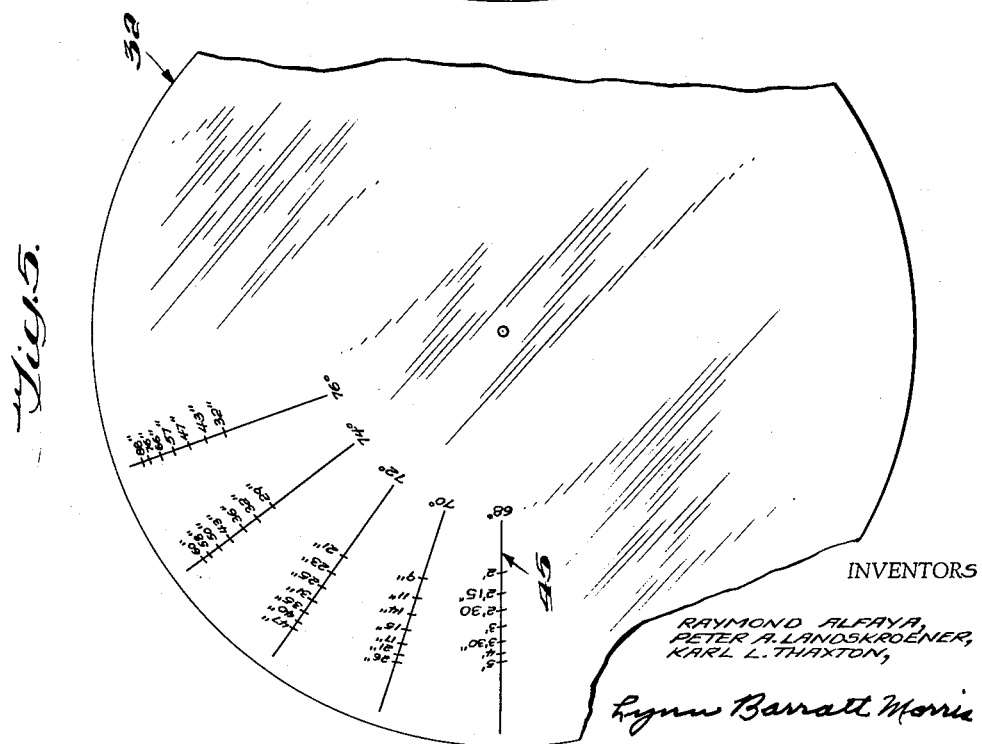
INVENTORS
RAYMOND ALFAYA,
PETER A. LANDSKROENER,
KARL L. THAXTON,
Lynn Barratt Morris
ATTORNEY July 31, 1962  R. ALFAYA ETAL  3,047,221
CALCULATOR Filed June 10, 1960  5 Sheets-Sheet 4

INVENTORS
RAYMOND ALFAYA,
PETER A. LANDSKROENER,
KARL L. THAXTON,

BY Lynn Barratt Morris

ATTORNEY

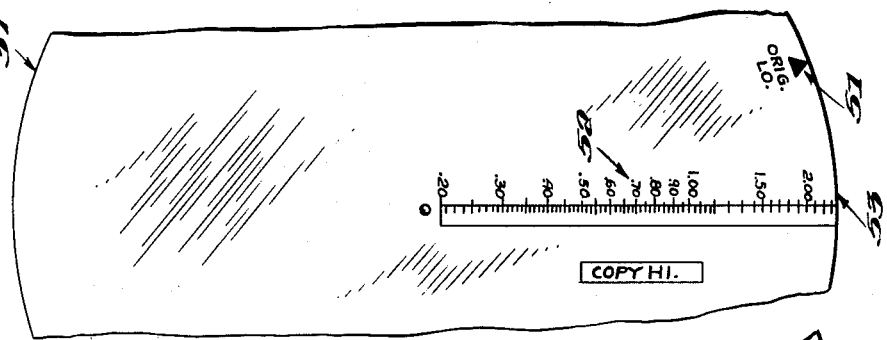
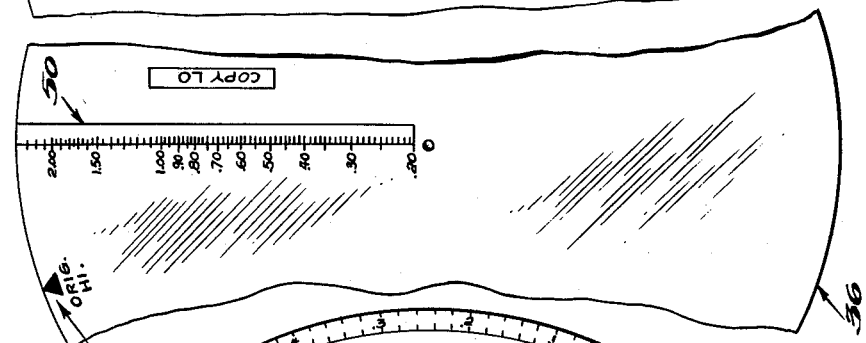
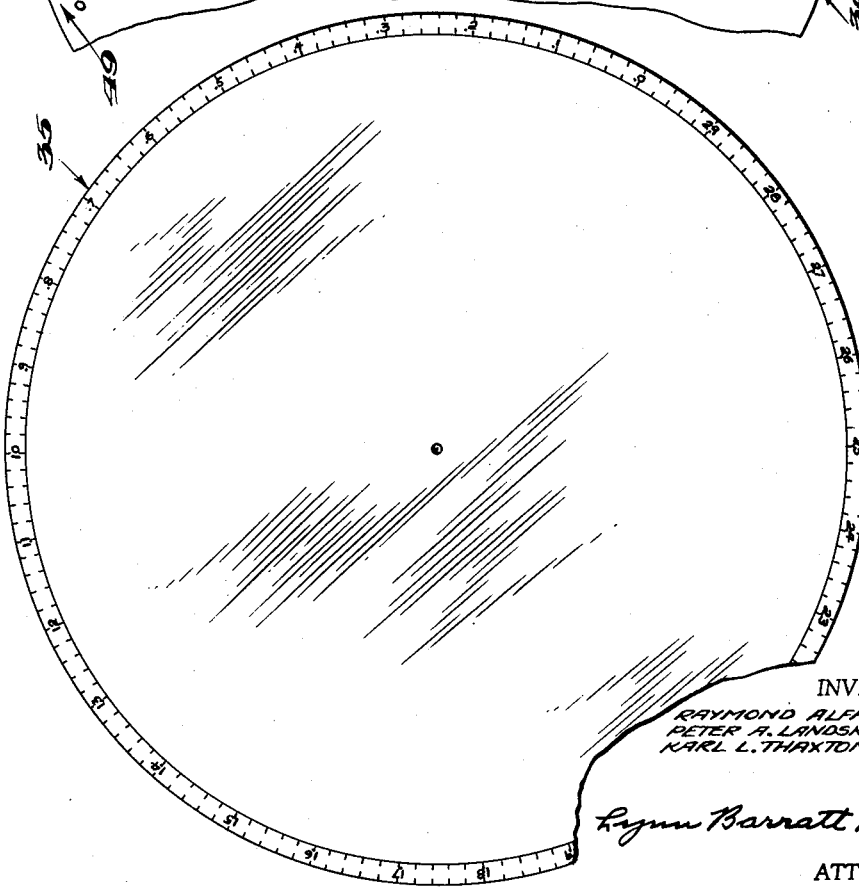

United States Patent Office 3,047,221
Patented July 31, 1962

3,047,221
CALCULATOR
Raymond Alfaya, Bloomfield, Peter A. Landskroener, Middletown Township, Monmouth County, and Karl L. Thaxton, Cranford, N.J., assignors to E. I. du Pont de Nemours and Company, Wilmington, Del., a corporation of Delaware
Filed June 10, 1960, Ser. No. 35,313
7 Claims. (Cl. 235—64.7)

This invention relates to a calculator for photographic use and more particularly to a device for selecting the required exposure and development to make positives or negatives with correct density ranges.

Various types of calculators, including those of the circular slide-rule type, have been used in photography to select the proper exposure, either for the original camera exposure or for a printing exposure in making photographic copies. Other calculating devices are known which enable the user to determine the proper development conditions, e.g., to obtain a desired contrast. No calculating devices, however, are known which are capable of simultaneous read-out of exposure and development conditions; particularly where exposure is corrected for reciprocity law failure.

According to Bunsen and Roscoe, "Photochemische Untersuchungen, der Physik und Chemie," Pogg. Ann., (2) 1862, 117: 529, the product of a photochemical reaction should be dependent on the total exposure which is equal to the product of the intensity of the exposure and the time of the exposure. Their statement, now referred to in photography as "the reciprocity law" is merely an approximation, deviations from which have long been a source of error in calculating correct photographic exposure conditions. No simple calculating devices are known in the prior art which are able to compensate accurately and conveniently for the deviations in the "reciprocity law" over wide ranges of conditions, and for a variety of photographic films.

An object of this invention is to provide a device for quickly and accurately calculating exposure and development conditions for processing photographic films thus obviating the need for extensive trial and error tests to determine the said conditions. It is an object of this invention to provide a novel and improved calculator for simultaneous read-out of exposure and development conditions in graphic arts use. A more particular object is to provide such simultaneous read-out while also providing correction for deviations from the reciprocity law. Another object of this invention is to provide a calculating device which requires a minimum of calibration and recalibration for effective use. Still other objects will be apparent from the following description of the invention.

These and other objects are realized in the device of this invention which is a calculator in the form of a circular slide rule for determining appropriate exposure and development conditions of photographic films, said calculator comprising a fixed base plate containing a polar coordinate array with logarithms of optical density measured radially and with logarithms of relative exposure measured angularly, over which is rotatably mounted the following elements:

(a) A member containing a series of curves of log optical density versus log relative exposure plotted thereon, each of said curves representing a certain development time, said member in cooperative relation to said base plate and capable of being rotated relative thereto to allow the use of emulsions which have different sensitivities to light, (b) A member containing developer temperature compensation values in terms of development times in cooperative relation with the base plate and member (a), (c) An exposure time scale member containing a series of concentric circles, each of said circles having a logarithmic plot of exposure time corrected for reciprocity law failure for any given photographic emulsion, (d) A time index member having a pointer thereon which indicates the required exposure time on member (c), (e) A density scale member containing a circumferential plot of optical density which relates to the log exposure scale of the fixed base plate, (f) An "original-high," "copy-low" read-out scale member having an "original-high" index pointer thereon for cooperation with said density scale member (e) and having a "copy-low" radial logarithmic scale of optical density for cooperation with the said curves of member (a), and (g) An "original-low," "copy-high" read-out scale member having an "original-low" index pointer thereon for cooperation with said density scale member (e) and having a "copy-high" radial logarithmic scale of optical density for cooperation with the said curves of member (a). Memeber (a) may be incorporated as part of the indicia contained on the base plate. Member (b) may be incorporated as part of the indicia contained on either the base plate or member (a). Time index member (d) in indicating the required exposure time on member (c) also cooperates with members (e), (f) and (g) in ways which will be clarified hereinafter.

The calculator of this invention will be understood more readily from the following description when reference is made to the accompanying drawings wherein:

FIGURE 3 is a detail of the fixed base plate containing the polar coordinate array.

FIGURE 4 is a detail of a member containing curves of log density versus log relative exposure for a development time series. These curves, shown here in the form of logarithmic spiral curves, could be incorporated as part of the fixed base plate. When the curves, however, are on a separate, rotatable member as shown in FIGURE 4, they may be rotated relative to the base plate to allow the use of emulsions which have different sensitivities to light.

FIGURE 5 is a detail of an optional member containing developer temperature compensation values in terms of development times. Part of the information shown on this member serves as an index of the member shown in FIGURE 4 but this indexing information could equally well be shown directly on the member of FIGURE 4.

Figure 6:
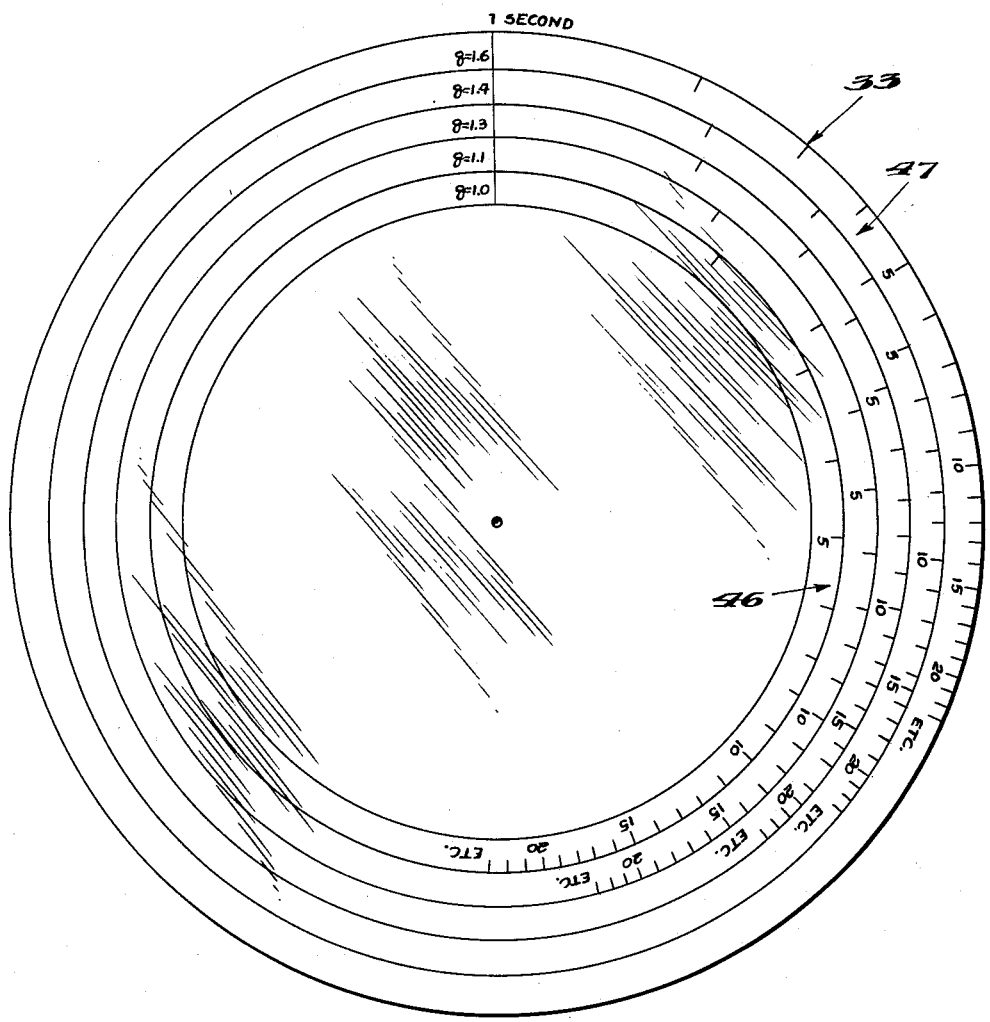

FIGURE 6 is a detail of a member containing a series of concentric circles graduated to represent movable time scales containing logarithmic plots of exposure time as corrected for reciprocity law failure. Different photographic emulsions vary in their deviation from the reciprocity law and it can be determined, for any given photographic emulsion, which of the concentric circles of this member is most appropriate for the given emulsion. Optionally, this member may show only a single graduated circle containing a logarithmic exposure time scale corrected for reciprocity law failure of one particular photographic emulsion type. In this case it would be necessary to use similar, interchangeable members if the calculator were to be used in conjunction with more than one type of photographic emulsion.

FIGURE 7 shows a time index member which could be in the form of a cursor with a single index line as well as the disc shown in this figure.

FIGURE 8 is a detail of a member containing a density scale which relates to the log exposure scale of the fixed base plate.

FIGURE 9 is a detail of a member containing the "original-high," "copy-low" read-out scale.

FIGURE 10 is a detail of a member containing the "original-low," "copy-high" read-out scale.

Figure 1:
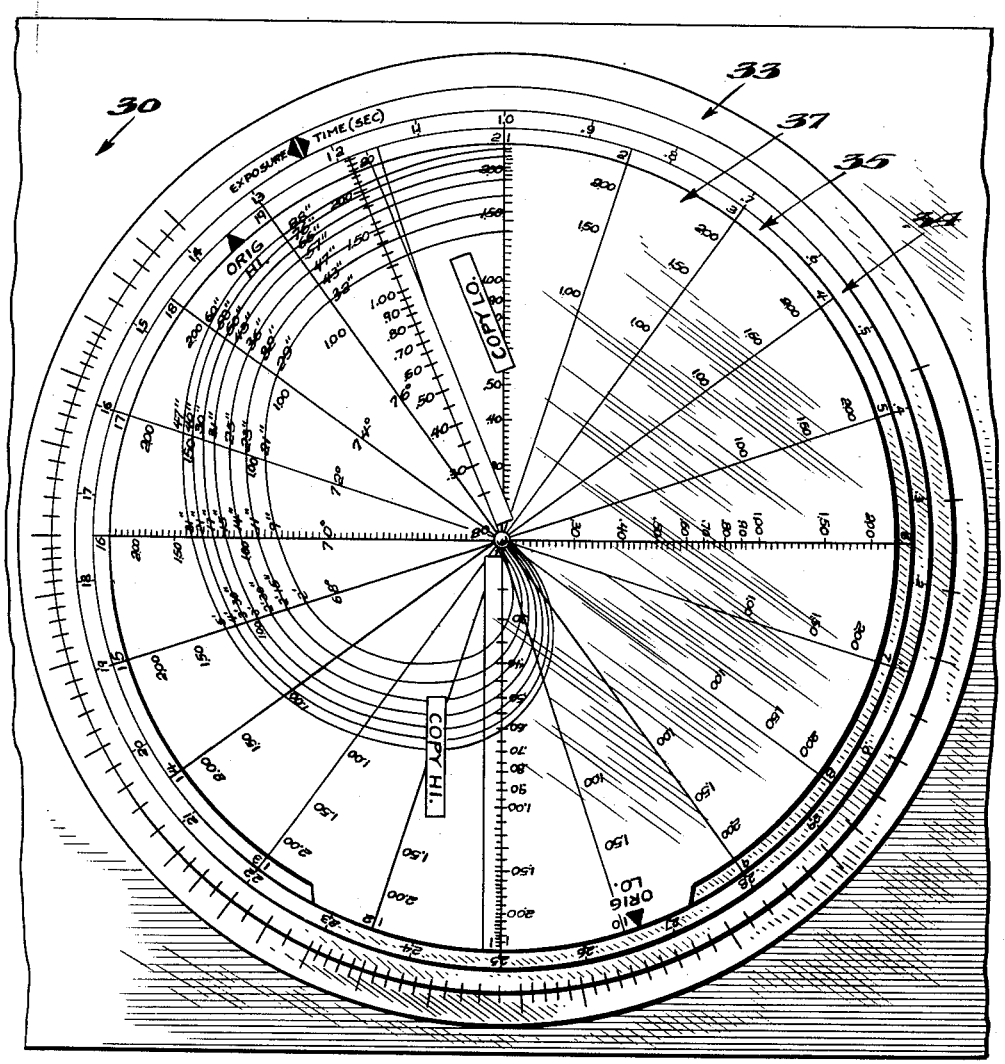
FIGURE 1 is an assembled view of the complete calculator, somewhat simplified for the sake of clarity and understanding.

Now referring to the various figures, the separate parts of the calculator have been illustrated in detail. In FIGURE 1 the calculator is shown from a top view with the various members assembled. The degree of detail of the members shown has been kept to a minimum for the sake of visual clarity. Since the members are preferably transparent, it is not possible to describe which scales, curves, indicia, etc. are on the members with reference to the assembled view in FIGURE 1.

Figure 2:
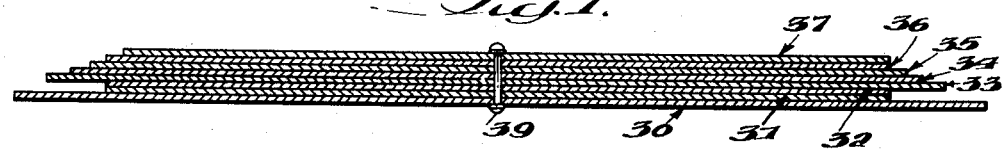
FIGURE 2 is a section at the vertical center line of FIGURE 1 wherein the members are exaggerated in thickness for explanatory purposes.

FIGURE 2 represents a cross-sectional view of the calculator along the center line with the members assembled. The various members rotate relative to the base plate 30 about pivot member 39 which is fixed at either end by suitable means known in the art. The base plate 30 should be at least as large as any of the members 31 through 37 mounted rotatably thereon. The upper five members, 33 through 37 should have decreasingly smaller diameters as they are located further from the base plate so that the top member 37 will be the smallest of these five movable members. The size of the lower two movable members, 31 and 32, is not critical but in a preferred embodiment of the calculator, as is shown in the figures herein, members 31 and 32 are discs having the same diameter as member 36. The various members of the calculator will be described at length hereinafter.

In FIGURE 3, the base plate, generally indicated by numeral 30, is of square outline, although another shape would serve equally well, e.g., rectangular, circular, etc. Twenty radial lines 41 are shown inscribed in a circle, numbered from 2 to 21, and radially graduated logarithmically to represent values of optical density from 0.20 to 2.50. The angular displacement between adjacent radial lines represents a square-root-of-two difference in exposure level. Thus, the exposure at radial line 10 represents the exposure at line 9 multiplied by the factor $\sqrt{2}$ or double the exposure represented at line 8. In photographic sensitometry, it is the normal procedure to expose film through an optical wedge in which the densities vary by $\sqrt{2}$, conveniently containing 21 steps, e.g., according to the procedure based on the American Standard Method for the Sensitometry of Medical X-Ray Films—PH 2.9—1956. In this calculator the numbering of these steps corresponds with the numbering of the radial lines of the base plate. The single radial line numbered 21 corresponds both with exposure step 21 and with exposure step 1.

In FIGURE 4, the first movable member 31 contains curves 42, shown here in the form of spirals, or logarithms of optical density versus logarithms of relative exposure for a development time series. The innermost spiral curve 43 represents the shortest time of development in the series, while the outermost spiral curve 44 represents the longest time of development. These spiral curves need not be drawn on a separate member, but can be drawn directly on the fixed base plate upon which the coordinates are shown. Increased utility and flexibility in use of the calculator is achieved, however, by placing the spiral curves on a separate member, movable relative to the base plate, since such a relative movement of this member allows the use of emulsions which have different sensitivities to light.

In FIGURE 5 there is shown a second movable member 32 which contains the developer temperature compensation values in terms of development times. The radial line 45 marked "68° F." is the basic development time reference line. This line is graduated to serve as an index for the spiral curves shown in FIGURE 4. Member 32 is rotated relative to member 31 until the innermost spiral curve 43 lines up with the two minute development time mark on the "68° F." radial line 45 of member 32; in this configuration, the development times represented by the other spiral curves on member 31 can be determined from this index line on member 32. The other radial lines on member 32 give correction values in terms of seconds to be subtracted from the development time that one would calculate for the basic "68° F." line. Member 32 and member 31 can be interchanged so either may be immediately adjacent to the base plate. Member 32 is not considered an essential member in this calculator since the spiral curves of member 31 may be directly labeled according to the development times which these spiral curves represent. When present, however, members 31 and 32 are always locked together in their proper position. The temperature compensation values (seconds to be subtracted from originally calculated development times) need not be shown on a movable, separate disc, but could be printed equally well in tabular form, e.g., on the back of the base plate.

In FIGURE 6 there is shown member 33 containing a number of concentric circles representing logarithmic values of exposure time corrected for "reciprocity law" failure. Each concentric circle is graduated according to exposure time as corrected for a different degree of "reciprocity law" failure. The innermost circle 46 represents relatively small departures from the reciprocity law while the outermost circle 47 represents relatively greater departures from the "reciprocity law."

In FIGURE 7 there is shown a time index member 34 having pointer marks 48 which indicate the required exposure time to produce the desired copy density as a function of a given original density. Although this member is shown as a disc, a cursor would serve equally well.

In FIGURE 8 there is shown a density scale on movable member 35 which relates to the log exposure scale of the fixed base plate. Identical density values are shown on two concentric circles on this member so that the scale of the outer circle is in cooperative relationship with the exposure time pointer marks 48 on member 34 while the scale of the inner concentric circle is in cooperative relationship with the index marks 49 and 51 of the members shown in FIGURE 9 and FIGURE 10.

In FIGURE 9 there is shown a member 36 containing an "original-high" index mark 49 at its periphery (which cooperates with the inner of the two concentric circle density scales of member 35) and a "copy-low" radial line 50 graduated logarithmically according to optical density, duplicating the scale of the radial lines on the base plate 30.

In FIGURE 10 there is shown a member 37 containing an "original-low" index mark 51 at its periphery (which also cooperates with the inner of the two concentric circle density scales of member 35) and a "copy-high" radial line 52 graduated logarithmically according to optical density, duplicating the scale of the radial lines on the base plate 30. While the major portion of the circle comprising member 37 has a radius less than that of member 36, the section of the periphery 53 having the index mark 51 and radial line 52 thereon is preferably of the same radius as member 36.

All of the movable members, 31 through 37, should preferably be transparent except in those areas containing printed indicia. Translucent materials could function similarly to the transparent materials, but less satisfactorily. The base plate should preferably be of a white opaque material but a transparent base plate gives quite satisfactory performance. Printed indicia should preferably be shown clearly in black or some color having high visual contrast. In a preferred embodiment, however, the curves shown on member 31 are advantageously of different colors to distinguish them from one another.

CONSTRUCTION OF THE CALCULATOR

This embodiment of the calculator is designed for use with a 21-step optical wedge wherein each step varies from an adjacent step by the factor of a square-root-oftwo. In this embodiment, the base plate is shown to have 20 radius vector lines, equally spaced at 18 degree intervals, corresponding to steps number 2 through 21 of the step wedge used in making sensitometric exposures. The origin line is numbered "21" but this same radius vector line also represents step "1." The radius vector lines extend from near the center out to a radius equal to the radius of the outermost movable member 37 and along these lines, a logarithmic scale is printed to correspond to the optical density range which is considered desirable. Optical density is defined as log $I°/I$ wherein $I°$ is the intensity of the incident rays and $I$ is the intensity of the transmitted rays; in this case, a density range of 0.20 up to 2.50 has been selected.

On the first movable element 31 there are shown curves of log density versus log relative exposure for a development time series. The information to be printed on this member is obtained by actually testing a selected photographic film. Optimum results will be obtained for the case in which the calculator is used for the film from which the sensitometric data was obtained in preparing the curves drawn on member 31. In practice, however, it has been found that a group of films having similar sensitometric properties can be used with a calculator which has been constructed according to sensitometric data which has been obtained for a representative film. The procedure for constructing element 31 involves the following steps:

(1) Select the best available representative photographic film, light source and exposure time.

(2) Select a number of development times (seven, in the illustrated case ranging from 2 to 5 minutes) which will center about what is considered the optimum time to produce the contrast necessary to make an acceptable copy from a representative original.

(3) Expose a number of film strips from the selected film, all with the same selected exposure time and using the same light source, so that there will be at least two film strips for each development time selected. The exposure is made through a conventional 21 step square-root-of-two optical wedge as previously described.

(4) Develop two or more of the exposed samples, in separate developments, for each of the development times selected. Developer replenishment, temperature control and agitation procedures must be carefully standarized to insure reproducible results.

(5) After development, the film strips are given conventional black and white processing treatments (fixing, washing and drying) and their optical densities are read at each exposure step on a photographic sensitometer. The optical densities thus obtained are then plotted against the exposure steps on rectangular coordinate paper, and a smooth curve is drawn through the average of the plotted points.

(6) From these smooth curves, optical density values are taken at each step and these figures are plotted on transparent member 31 which is superimposed over the coordinate system shown on base plate 30. These points are then connected by smooth lines to produce the series of spiral curves shown in FIGURE 4. For purposes of differentiation, it is convenient to use different colors for each spiral curve. As pointed out previously, these curves could be drawn directly on member 30, eliminating member 31 as a separate member.

Member 32, shown in FIGURE 5, indexes the development times for the spiral curves of member 31 at the temperature of development (in this case 68° F.). Index marks are shown along a radius vector line and drawn to coincide with the spiral curves which they are indexing. The other data is merely a tabulation of experimentally determined temperature compensation values, indicating the reduction in development time (in seconds) required to compensate for various increases in development temperatures. Radius vector lines representing other development temperatures are arbitrarily placed and marked so that the correction values indicated will line up with the spiral curve for which the correction is to be indicated. This is merely a convenient method for showing such data.

Probably the most significant element in this calculator is a movable time scale 33 shown in FIGURE 6 which contains logarithmic plots of exposure time which are corrected for "reciprocity law" failure for various types of photographic emulsions. It has been found in practical work in the graphic arts field that the range of exposure times actually used is sufficiently limited so that the Schwarzschild equation accurately represents the reciprocity behavior of any given photographic film. In this equation, expressing the exposure conditions required to give constant optical density of the processed film, $$It^p = \text{constant}$$

where I=exposure intensity, $t$=exposure time and $p$=the Schwarzschild constant. For our calculations we have found it convenient to use the value $q$ which has been defined as the reciprocal of the Schwarzschild constant, $p$. The Schwarzschild equation is discussed in Mees, The Theory of the Photographic Process, revised edition, The MacMillan Co., (1954) pages 199–200. For any given graphic arts film there can be determined some specific value of $q$ which may be considered as a constant exponential correction factor over the useful range of exposure times and intensities. Four values of $q$ should be sufficient to cover most of the films used in the graphic arts trade, since accurate results can be obtained with this calculator by interpolation where there is no provision for the exact value of $q$ which is required. Thus, in the embodiment illustrated in FIGURE 6, there are shown 5 concentric circular scales, each scale representing, as a logarithmic function along the angular coordinate of a polar coordinate system, the exposure time as exponentially corrected for "reciprocity law" failure by the factor $1/q$.

The markings on any given "$q$" scale should relate the effect of "corrected" exposure time to the optical density of the processed film having the corresponding value of $q$, the intensity of the exposing light being held constant. In constructing the scales, it is necessary to calculate, along the angular coordinate, values of an angle $\alpha$ which is a function of the "corrected" exposure time.

Since intensity is to be held constant it is obvious that, over the range of exposure times wherein the Schwarzschild equation is valid, the angle $\alpha$ must be proportional to the value log $t^p$=log $t^{1/q}$. Stated mathematically, $\alpha = k$ log relative $t^{1/q} = k/q$ log relative $t$ where $\alpha$ is the angular displacement between an origin and any given value of $t$, where $t$ is the exposure time, an where $k$ is the factor of proportionality which will be specifically defined below. Thus $q$ is seen to be a constant multiplier for the angle $\alpha$ over the range of exposure times wherein $q$ has an essentially constant value.

Construction of member 33 involves the setting up of a time scale to relate to the polar coordinate system of the base plate where it has been found convenient to express the logarithms of relative exposure angularly in terms of 20 equally spaced radius vectors corresponding to exposure steps differing from one another by the factor $\sqrt{2}$. Since there are 20 equally spaced marks in 360°, each mark is 18° from its neighbor. This 18° is equivalent to an exposure factor $\sqrt{2}$ and, since the exposure factor is expressed logarithmically, 18° is equivalent to log $\sqrt{2}$ exposure units=0.15 exposure units. This equivalency between the angle $\alpha$ and the exposure units is the proportionality constant "$k$" in the equation $$\alpha = \frac{k}{q} \log \text{relative } t$$

which can now be written $$\alpha = \frac{18/0.15}{q} \log \text{ relative } t = \frac{120}{q} \log \text{ relative } t$$

For a particular concentric circular scale, e.g., for the value of $q=1.3$, $$\alpha = \frac{120}{1.3} \log \text{ relative } t$$

or $$\alpha = 92.3 \log \text{ relative } t$$

Various values of exposure can be substituted in the equation in order to find the corresponding angle to be marked off. In making these calculations, relative exposure time was expressed in seconds so that at a one second exposure, $\alpha = \log 1 = 0$. Therefore, one second exposure represents the origin of the scale. Where the time in 2 seconds, $\alpha = 92.3 \log 2 = 27.8°$. In this manner, scales can be constructed for as many values of $q$ as are desired.

Making of the remaining movable members of this calculator is simple and straight-forward. The time index member 34 is shown in FIGURE 7 as a simple disc with a single index mark or pointer on its periphery. A cursor could work equally well in place of the disc.

The density scale of member 35, as shown in FIGURE 8, ranges in value from 0 to 3.0 density units in such a manner as to correspond to a separation of adjacent radial lines on the base plate by .15 density units.

Finally, the small discs 36 and 37, shown in FIGURES 9 and 10 respectively, are substantially identical except for labelling of the radius vector density scales and the pointers. In the embodiment of the invention shown in FIGURE 10, member 37 is cut in such a way that over most of the disc the radius is slightly smaller than the radius of member 36. This is not absolutely necessary for proper performance of the calculator but it does allow somewhat easier manipulation (grasping of the desired member) than if the radii of members 36 and 37 were identical over the whole of the discs.

CALIBRATION OF CALCULATOR

Calibration of the calculator can be most easily explained by reference to an actual example of the process. In this example the "original" will be a negative which is to be copied onto a positive. The more general words "original" and "copy" are used since the calculator can be used equally well in solving problems relating to the copying of a negative onto a positive or to the copying of a positive onto a negative.

Calibration, in this example, involves setting up the calculator so that problems can be solved relating to a particular positive film which is to be used. In this example, the positive film is known to have a value of $q=1.3$. Should the value of $q$ of the film to be used be unknown, it could be determined by exposing various samples of the film to different exposure conditions, i.e., different intensities and different times of exposure. By determining the combinations of time and intensity that produce a given constant optical density in the exposed films, after processing, it is possible to solve for $q$ in the equation.

$$It^{1/q} = \text{constant}$$

the symbols being as defined above. Normally, the film manufacturer can supply the user with the information relating to the value of $q$ so that the above described experiments and calculations are not necessary for the user.

Having determined that $q=1.3$ for the positive film for which the calculator is to be calibrated, the next operation involves exposing a strip of this positive film through a "negative" containing a 21-step square-root-of-two optical wedge image. The exposure time and light source should be chosen to represent conditions normally used in the process for which the calculator is being calibrated. The exposed positive is developed and processing is completed under conditions as similar as possible to the conditions that would be used subsequently in making actual prints from negative subject matter. The steps on the "negative" optical wedge are determined which correspond to the average high density and average low density of shop negatives which will be routinely used. In this example, we assume that step number 4 represents an average low density and that step number 11 represents an average high density. In other words, the useful density range of this negative is between steps number 4 and number 11 of this 21 step optical wedge. Assume that the "negative" step wedge has an optical density equal 0.50 at step number 4 ("original-low") and an optical density equal 1.55 at step number 11 ("original-high").

The exposed positive is developed, in this example, at 68° F. for 3 minutes and 30 seconds in a given developer. The image areas of the processed positive which were exposed through steps number 4 and number 11 of the "negative" are determined respectively, to have optical densities of 1.60 ("copy-high") and 0.55 ("copy-low"). The exposure used in this example was 20 seconds. All of the data now has been given which is required to calibrate the calculator for use with the positive film of the example. The calibration will now be described in five steps as follows:

(1) Set the "original-high" pointer of member 36 at the negative-high value of 1.55 on member 35 and secure member 35 and member 36 together in this position.

(2) Set the exposure time pointer of member 34 to the same density value of 1.55, securing member 34 to member 35 in this position.

(3) Rotate this 3-member assembly until the exposure time pointer of member 34 is in line with the exposure time representing 20 seconds on the concentric circular scale of member 33 representing a value of $q=1.3$. Member 33 is secured to the assembly in this position, and thus the exposure time of 20 seconds is "fed in" to the calculator.

(4) The four-member assembly (members 33, 34, 35 and 36) is now rotated until the copy-low density value (which, in the example, was read and found to be 0.55) on the radius vector scale of member 36 falls directly on the spiral curve of member 31 which represents the development time of 3 minutes 30 seconds. Member 33 is now secured to the base plate.

(5) The final step in calibration is removal of the securing means (e.g., small pieces of pressure-sensitive tape) which locks together members 33 and 34 and removal of the securing means which locks together members 35 and 36. Members 34 and 35 remain locked together. The calculator is now ready to work actual problems, using the same exposing light source used during calibration. For a different light source, the calibration would have to be repeated in order to insure proper compensation for "reciprocity law" failure.

*Example I*

It is desired to make a print on a positive, such as was used above in the calibration of the calculator, from an original which is a continuous tone graphic arts negative. It is further desired that the finished copy be on a graphic arts, continuous tone positive film and have a useful range of optical densities of 0.30 to 1.60. Development temperature is to be 68° F. In the positive film, $q=1.3$. The problem is to find the correct exposure and development times to give a satisfactory copy, using the same developer solution and the same exposing light source as was used in the calibration. The negative original which is to be copied is examined in a conventional densitometer and found to have an optical density range of from 0.30 to 1.55. Calibration of the calculator is carried out as described above using a developer solution of the following composition in the calibration:

| | | |
|---|---|---|
| Monomethyl-p-aminophenolsulfate | g | 2.5 |
| $Na_2SO_3$ (desiccated) | g | 50.0 |
| Hydroquinone | g | 2.5 |
| Sodium carbonate $Na_2CO_3 \cdot H_2O$ | g | 24.0 |
| Borax | g | 14.0 |
| KBr | g | 0.5 |
| $H_2O$ to make | liter | 1.0 |

This developer solution was diluted with an equal volume of water and was used in the calibration at a temperature of 68° F.

Using the properly calibrated calculator, member 36 was rotated until the original-high pointer was set at 1.55 (the highest optical density of the negative) and member 36 was secured to member 35 in this position. Member 37 was then rotated until the original-low pointer was set at optical density of 0.30 (the lowest optical density of the negative) and member 37 was secured to member 36 in this position. The assembly, which then consisted of members 34, 35, 36 and 37, was rotated in order to find the best "fit" for the desired copy-high and copy-low optical density values (1.60 and 0.30, respectively) on one of the spiral curves of member 31. This "fitting" was done by a trial and error method which, however, can be done very quickly after acquiring some experience with the calculator. For example, the following procedure was used in this case:

(a) The assembly was rotated until the copy-low value of 0.30 fell on the innermost spiral curve of member 31 (2 minute development time) and it was seen that this spiral curve intersected the copy-high scale of member 37 at an optical density of 1.25. This would have given an insufficient density range.

(b) The copy-low figure of 0.30 optical density was then set, by rotation of the assembly, on the outermost spiral curve of member 31 (5 minutes development time) and it was seen that this spiral curve intersected the copy-high scale of member 37 at 1.70 optical density. This would have given more than the desired density range.

(c) By trying various intermediate settings, it was quickly found that the 5th spiral curve (counting outwardly) of member 31 gave the best "fit" for a density range in the positive from 0.30 to 1.60; therefore, the proper development time was determined to be 3 minutes 30 seconds. It should be noted that, if an exact "fit" is not found, an excellent estimate of the optimum development time can be obtained by interpolation; a less reliable estimate is obtainable by extrapolation. With the assembly in this position, it was also determined that the exposure time pointer on member 34 coincided with the eight second mark on member 33; therefore, eight seconds was determined to be the correct exposure.

Using information obtained from the calculator, the positive film was exposed through the negative for eight seconds, using the same light source at the same distance as was used in the calibration. The positive film was then developed for 3 minutes 30 seconds in the same developer solution used in calibration, and processing was completed maintaining all conditions as close as possible to those maintained during calibration, e.g., agitation, temperatures, etc. By this procedure using the data obtained from the computer, a positive copy was obtained having excellent picture quality and having an optical density range of 0.30 to 1.61 which compares favorably with the desired range of 0.30 to 1.60.

*Example II*

Example I was essentially repeated except that the negative to be copied had a density range of 0.35 to 1.90. The desired range of density of the positive remained the same as in Example I, i.e., 0.30 to 1.60. It was desired that the same developer solution be used as in Example I but the development temperature was to be increased to 74° F. It was unnecessary to recalibrate the calculator since changes in development temperature can be compensated for by use of the indicia of member 32. The problem was solved as follows:

The original-high pointer was set at an optical density of 1.90 and members 35 and 36 were secured together in this position. The original low pointer was then set at an optical density of 0.35 and member 37 was secured to member 36 in this position. The assembly (members 34, 35, 36 and 37) was then rotated to find the best "fit" (as described in the preceding example) for the desired copy-high and -low values of optical density, 1.60 and 0.30 respectively. This "best fit" was found to be the spiral curve of member 31 which represented a development time of 2 minutes 15 seconds in which position of the assembly the exposure time index member 34 gave a reading on the time scale of members 33 of 37 seconds as the correct exposure time. From the indicia of member 32, it was determined that, for a development time of 2 minutes 15 seconds (calculated for the "standard" development temperature of 68° F.), a correction factor of minus 32 seconds development time would be necessary to compensate for an increase in development temperature from 68° F. to 74° F. Subtracting 32 seconds from the time of 2 minutes 15 seconds gave an answer of 1 minute 43 seconds as the correct development time at a temperature of development of 74° F.

The positive film was exposed through the negative for 37 seconds and developed for 1 minute 43 seconds at 74° F. in the developer solution used in calibration of the calculator. A print of excellent picture quality was obtained, having a density range from 0.29 to 1.58 comparing favorably with the desired range of 0.30 to 1.60. Without benefit of the calculator, many trial exposures and development conditions would have been required to obtain this desired quality of the positive copy.

*Example III*

The problem of the preceding examples was reversed in that it was desired to obtain a negative copy from a positive original. The positive print obtained in Example I, having an optical density range from 0.30 to 1.59, was used as the original. It was desired to obtain a negative copy of this print having a density range of 0.30 to 1.56. The film employed to make the negative copy was a high speed, continuous tone graphic arts film. Calibration of the calculator was carried out by the process described earlier using the density values of the positive as the "original" and the desired density values of the negative as the "copy" inputs. The negative was developed at 68° F. in a developer of the following compositions, diluted with an equal volume of tap water shortly before use:

| | | |
|---|---|---|
| Monomethyl-p-aminophenolsulfate | g | 1.0 |
| $Na_2SO_3$, anhydrous | g | 75.0 |
| Hydroquinone | g | 9.0 |
| $Na_2CO_3 \cdot H_2O$ | g | 29.0 |
| KBr | g | 5.0 |
| $H_2O$ to make | liter | 1.0 |

When calibration was completed, the original-high pointer was set at 1.59 (the highest density reading of the positive which was to be copied) and the original-low pointer was set at 0.30 (the lowest optical density reading obtained on the positive) and the desired range of optical densities of the negative were "fitted" onto the spiral curves of member 31. The best "fit" for a negative having a desired low density of 0.30 and the desired high density of 1.56 was found at the spiral curve representing a development time of 2 minutes 15 seconds. At this setting of the rotatable assembly, it was found that the exposure time pointer gave a reading of 28 seconds. A negative of excellent quality was obtained as a copy of the positive original by exposing and developing according to the values determined by the calculator.

Although a very useful and convenient form of the calculator has been illustrated as the preferred embodiment, similar results can be obtained with calculators modified somewhat from the illustrated embodiment. Thus, the basic circular form of the device is merely the most convenient in form which can contain all the useful indicia which it is desired to have in such a calculator. For example, a device employing Cartesian coordinates instead of polar coordinates could produce the same results but it would be a much more cumbersome device. In the present embodiment, exposure steps are separated by the factor $\sqrt{2}$; an obvious equivalent would be the use of another value for the factor, e.g., $$\sqrt[3]{2}, \sqrt[4]{2}, \text{etc.}$$

The number of movable members could be reduced if one were willing to sacrifice the universality of the illustrated calculator. The spiral curves of member 31 could be drawn directly on the base plate but with this arrangement it would no longer be possible to adjust for emulsions which have different sensitivities to light by rotation of the spiral curves relative to the base plate. If it were desired to construct a simpler calculator, the most obvious element to be eliminated would be member 32 containing the developer temperature compensation values in terms of development times; these compensation values could be shown in an auxiliary chart or even printed on the back of the base plate. If member 32 were eliminated, it would merely be necessary to identify the various spiral curves according to the development times which they represent and this information could easily be printed on the member 31 containing these spiral curves or on base plate 30.

Members 31 and 32 can be interchanged in position since it is unimportant which of these two members are adjacent to the base plate. The other members, however, should be maintained in the positions shown in the sectional view of FIGURE 2 for best operation of this device.

The base plate itself can be square, rectangular, elliptical, circular, or irregular in shape, the most important requirement merely being that the base member is at least as big as any other member. For ease of manipulation, the movable members should have decreasingly smaller diameters as they are located farther from the base plate, although the size of members 31 and 32 is not governed by this rule (these two members may be of any convenient size).

The various indicia are, in general, shown in clear black print of high contrast. However, it may be advantageous to show certain indicia in various colors for better differentiation. It is particularly desirable to show the spiral curves of member 31 in different colors.

A variety of materials of construction may be used in this device. For ease of construction, it has been found most convenient to use a lith type positive so that the member can be reproduced photographically, giving indicia of high contrast on a transparent support. A particularly useful material for the base plate has been found to be an emulsion sensitized drafting film containing titanium dioxide pigments to make the base plate both white and opaque. Such a base plate has advantages that it can be photographically reproduced and that it has a white opaque reflecting surface so that all the indicia of the calculator can be clearly read. If the base plate is made of transparent material, it is convenient to place the calculator upon a piece of white paper when in operation. The base plate and movable members need not be reproduced photographically, but can be reproduced by conventional printing means, in which case any relatively stiff transparent material can be used such as cellulose acetate, cellulose triacetate, cellulose nitrate, polyethylene terephthalate or related polyester compounds, polycarbonate, polystyrene or any other similar transparent sheeting material. Any of a variety of devices, e.g., pins, rivets, snap-type structures, etc. can serve as the pivot 39 about which the movable members rotate.

In order to make the calculator useful for a wide variety of films it is necessary that member 31 (containing the spiral curves) be replaceable for each different type of film. These curves are specific for the sensitometric properties of a given film since they represent actual plots of sensitometric data at different development times for a particular film. However, it is well known that there are groups of films which have very similar characteristics as to the "toe," "shoulder" and length of the "straight line" portion of their sensitometric curves. Good results can be obtained when the same spiral curves are used for such a group of similar films. However, when another film type is to be used, which has an appreciably different sensitometric curve shape, it is necessary to replace member 31 with a corresponding member containing the applicable spiral curves.

Member 33, containing the series of concentric circles representing a series of movable time scales for different values of "$q$" as shown in FIGURE 6, is a convenient means for making the calculator adaptable for a wide variety of film types. If a shop should use only one type of film, it would be more convenient to use a simplified equivalent of member 33 which would contain a single movable time scale corresponding to the particular value of "$q$" of the film being used.

Small pieces of pressure sensitive tape have been referred to as a means of locking together the various movable members so that they may rotate as an assembly. Other methods are known which might be more convenient for accomplishing this purpose, for instance providing the movable members with a matte surface so that adjacent members will normally rotate together by friction but can easily be made to move separately by lifting one member relative to the other. Alternatively, the pivoting member 39 may be designed to hold movable members together with sufficient force of friction that they will rotate together unless extra force is exerted to make them move separately.

The calculator described herein is more sophisticated in concept, more versatile and more precise in operation than any system available outside of the electronic computers. To the average person in the trade, the cost of electronic computers is prohibitive. The relatively inexpensive and simple calculator of this application can guide any interested plant into a truly instrumental control of their photographic processes.

The advantages of this calculator then, are the improvements which it makes possible in cost and quality of the photographic product and the simplicity and low cost of the device itself. Specially simplified embodiments of the device may be constructed by carrying out part of the calibration during the initial assembly of the device, i.e., by the manufacturer. Thus the shop where the calculator is to be used can be furnished with a device which requires only a minimum of calibration for the particular type of film for which it is to be used.

A further advantage is the universality that is potentially available in this device. Compensations are possible for almost any variable in the photographic process which can be imagined. Such variables include adaptation to different types of films, compensations for speed or contrast changes caused by aging of the film or by possible variation in the manufacture of a particular type of film, compensation for changes in agitation of the developer solution, changes in developer temperature, changes in types and concentrations of the developer solution, and changes of light source or distance from light source during exposure.

What is claimed is:

1. A calculator in the form of a circular slide rule for determining appropriate exposure and development conditions of photographic films, said calculator comprising a fixed base plate containing a polar coordinate array with logarithms of optical density measured radially and with logarithms of relative exposure measured angularly, over which is rotatably mounted, in order, on a central axis the following transparent elements:

(a) a member containing a series of curves of log optical density versus log relative exposure plotted thereon, each of said curves representing a certain development time, said member in cooperative relation to said base plate and capable of being rotated relative thereto to allow the use of emulsions which have different sensitivities to light, (b) a member containing developer temperature compensation values in terms of development times in cooperative relation with the base plate and member (a), (c) an exposure time scale member containing at least one concentric circle, said circle having a logarithmic plot of exposure time corrected for reciprocity law failure for a given photographic emulsion, (d) a time index member having a pointer thereon which indicates the required exposure time on member (c), (e) a density scale member containing a circumferential plot of optical density which relates to the log exposure scale of the fixed base plate, (f) an "original-high," "copy-low" read-out scale member having an "original-high" index pointer thereon for cooperation with said density scale member (e) and having a "copy-low" radial logarithmic scale of optical density for cooperation with the said curves of member (a), and (g) an "original-low," "copy-high" read-out scale member having an "original-low" index pointer thereon for cooperation with said density scale member (e) and having a "copy-high" radial logarithmic scale of optical density for cooperation with the said curves of member (a).

2. A calculator as defined in claim 1 wherein the positions of elements (a) and (b) are interchanged.

3. A calculator as defined in claim 1 wherein said exposure time scale member contains a series of concentric circles.

4. A calculator as defined in claim 1 wherein said base plate and element (a) are combined as a single element, the curves of said element (a) being drawn in cooperative relationship on said base plate.

5. A calculator as defined in claim 1 wherein said base plate, element (a) and element (b) are combined as a single element, the curves of said element (a) being drawn in cooperative relationship on said base plate and being labeled according to the development times of element (b) which said curves represent.

6. A calculator in the form of a circular slide rule for determining appropriate exposure and development conditions of photographic films, said calculator comprising a fixed base plate containing a polar coordinate array with logarithms of optical density measured radially and with logarithms of relative exposure measured angularly, said base plate also containing a series of curves of log optical density versus log relative exposure plotted thereon, each of said curves representing a certain development time, over which is rotatably mounted, in order, on a central axis the following transparent elements:

(a) a member containing developer temperature compensation values in terms of development times in cooperative relation with the base plate, (b) an exposure time scale member containing at least one concentric circle, said circle having a logarithmic plot of exposure time corrected for reciprocity law failure for a given photographic emulsion, (c) a time index member having a pointer thereon which indicates the required exposure time on member (b), (d) a density scale member containing a circumferential plot of optical density which relates to the log exposure scale of the base plate, (e) an "original-high," "copy-low" read-out scale member having an "original-high" index pointer thereon for cooperation with said density scale member (d) and having a "copy-low" radial logarithmic scale of optical density for cooperation with the said curves of the base plate, and (f) an "original-low," "copy-high" read-out scale member having an "original-low" index pointer thereon for cooperation with said density scale member (d) and having a "copy-high" radial logarithmic scale of optical density for cooperation with the said curves of the base plate.

7. A calculator in the form of a circular slide rule for determining appropriate exposure and development conditions of photographic films, said calculator comprising a fixed base plate containing a polar coordinate array with logarithms of optical density measured radially and with logarithms of relative exposure measured angularly, said base plate also containing a series of curves of log optical density versus log relative exposure plotted thereon, each of said curves representing a certain development time, over which is rotatably mounted, in order, on a central axis the following transparent elements:

(a) an exposure time scale member containing at least one concentric circle, said circle having a logarithmic plot of exposure time corrected for reciprocity law failure for a given photographic emulsion, (b) a time index member having a pointer thereon which indicates the required exposure time on member (a), (c) a density scale member containing a circumferential plot of optical density which relates to the log exposure scale of the base plate, (d) an "original-high," "copy-low" read-out scale member having an "original-high" index pointer thereon for cooperation with said density scale member (c) and having a "copy-low" radial logarithmic scale of optical density for cooperation with the said curves of the base plate, and (e) an "original-low," "copy-high" read-out scale member having an "original-low" index pointer thereon for cooperation with said density scale member (c) and having a "copy-high" radial logarithmic scale of optical density for cooperation with the said curves of the base plate.

References Cited in the file of this patent
UNITED STATES PATENTS 1,042,755    Beckett _____ Oct. 29, 1912